Nov. 14, 1933.     L. D. WOODRUFF     1,934,961
TRAIN PIPE CONNECTER
Filed March 21, 1928     2 Sheets-Sheet 2
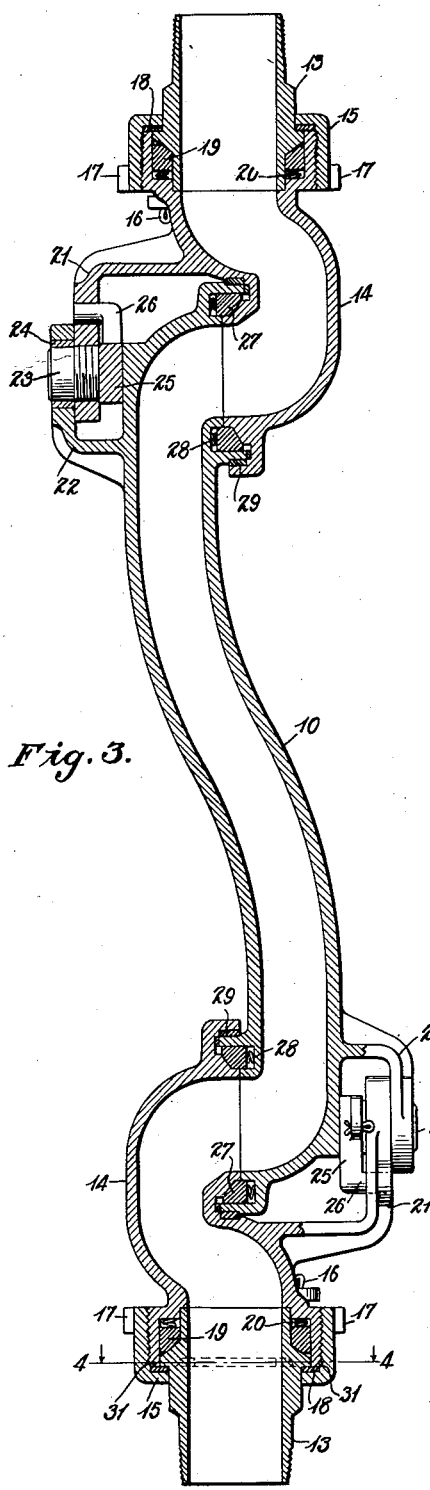
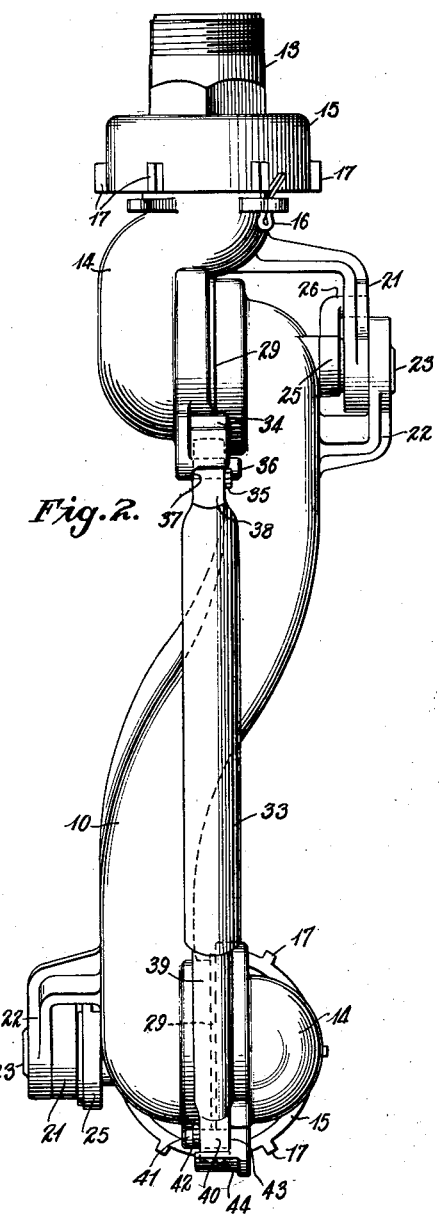
INVENTOR.
Leonidas D. Woodruff
BY
his ATTORNEYS.

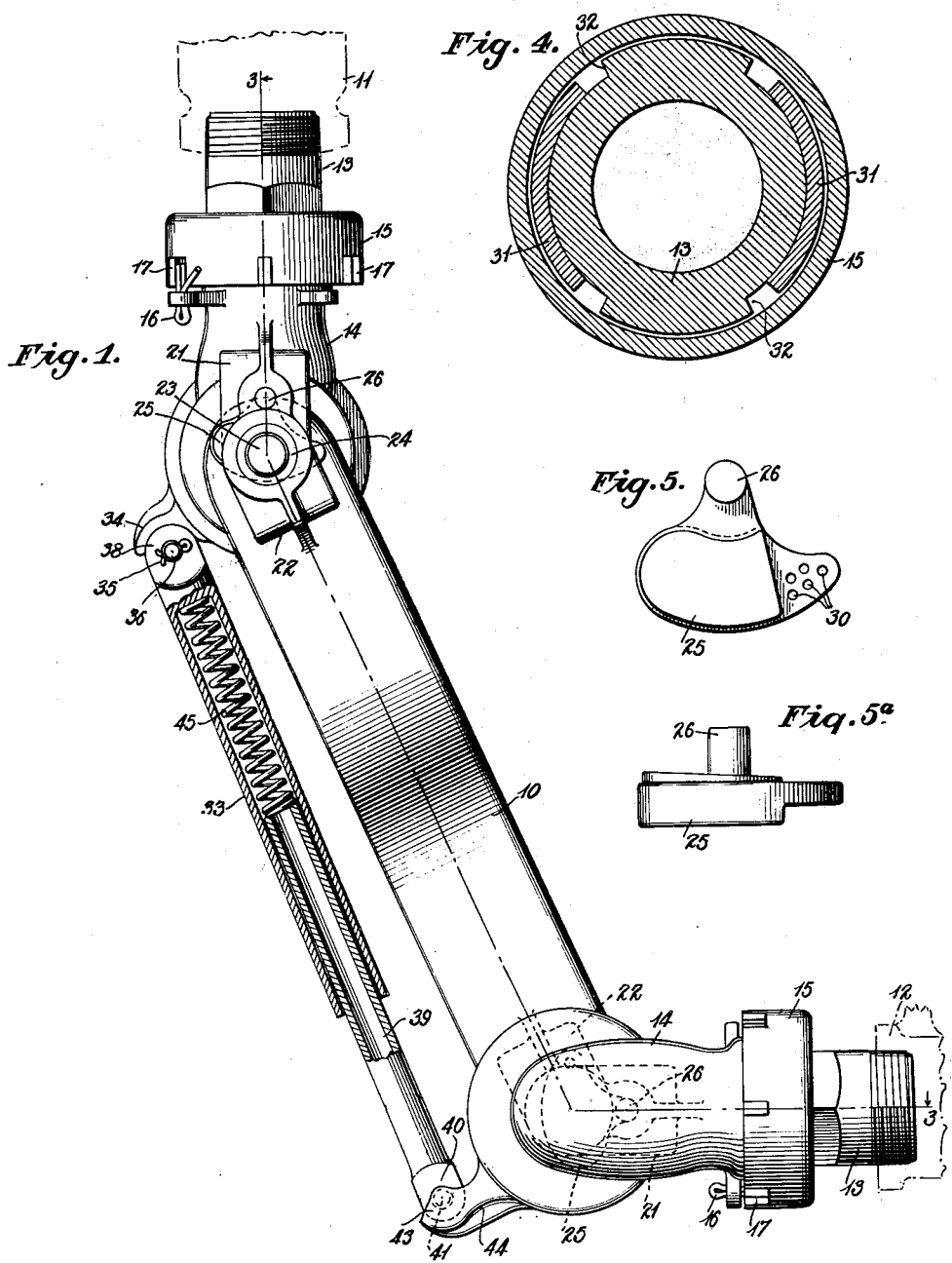

Patented Nov. 14, 1933

1,934,961

UNITED STATES PATENT OFFICE 1,934,961

TRAIN PIPE CONNECTER

Leonidas D. Woodruff, Chicago, Ill., assignor to Harris Trust & Savings Bank, trustee, Chicago, Ill., a corporation of Illinois Application March 21, 1928. Serial No. 263,495

23 Claims. (Cl. 285—7)

This invention relates primarily to a metallic train pipe connecter having an intermediate rigid section so articulated with the upper section from which it hangs and with the lower section which carries the coupler head as to enable the sections to change their angular relationship by swinging of the intermediate section relative to the other two, and equipped with means carried by the connecter for yieldingly supporting its lower end in a nondependent position; the object being to provide in conjunction with such a connecter an improved supporting device for the aforesaid purpose so arranged as not to interfere with or materially resist the adjusting action of the connecter or to exert undue strains on the coupler carrying section, and also so arranged as to leave the space between the connecter and the companion connecter with which it is coupled entirely clear of the supporting means, so that when the two connecters are employed for connecting the steam pipes of adjacent cars there will be no obstruction to said device by the air hose and signal house nor any interference with the free movements of such hose which cross over above the coupling heads of the steam pipe connecters. Further the invention aims to provide a connection with supporting means of practicable character simply and compactly arranged.

An illustrative embodiment of the invention is shown in the accompanying drawings, as applied to one practicable metallic connecter structure. The invention will be explained by reference to the drawings and will be particularly pointed out in the claims appended to this description.

In the accompanying drawings,—

Figure 1 is a side elevation of the illustrative connecter, the end valve of the steam line of the car and one of the coupler heads being shown in dotted lines, it being understood that a similar connecter is interposed between a cooperating coupler head and the end valve of the next adjacent car.

Fig. 2 is a rear elevation showing the means for retaining the lower portion of the connecter in a position where it will be impossible for it to contact with the track surface.

Fig. 3 is a longitudinal sectional view on the line 3—3 of Fig. 1, but representing the connecter as if it were stretched out in a straight line position.

Fig. 4 is a sectional view on the line 4—4 of Fig. 1.

Figs. 5 and 5a are plan and edge views, respectively, of a wedge plate for securing two sections of the connecter together.

Fig. 6 is a transverse sectional view of the intermediate member of the connecter.

The specific construction of the connecter selected for illustration is similar to that described and claimed in my copending application Serial No. 238,141, filed December 6, 1927. This particular connecter has a main intermediate hose casting 10 of S-shaped formation, whose ends communicate with passages in connecting members adapted to be attached to the end valve 11 of the train pipe and to the coupler head 12, it being understood that said coupler head is connected by a similar head and connecter with the end valve of the next adjacent car train pipe. The connections between said intermediate member 10 and the train pipe consist of a nipple 13 attached to a coupling sleeve 14 by a threaded sleeve 15 screwed on said sleeve 14. Sleeve 15 is held against rotation by a cotter pin 16 carried by said coupling 14 and engaging against one of a series of lugs 17 on said threaded sleeve. As will appear, this connection permits nipple 13 and coupling sleeve 14 to swivel or rotate relatively to one another, a bronze bushing 18 being interposed between the two parts at their bearing portions. To effect a liquid and gas tight joint, a gasket 19 is interposed between the sleeve and nipple, being held against a spherical surface formed on the nipple by means of spring elements 20. The coupling sleeve 14 is, in turn, connected to the intermediate hose casting 10, the connection being such that the coupling sleeve and member 10 may swivel or rotate with respect to one another but in a plane at right angles to that in which the sleeve and nipple 13 are adapted to swivel.

In order that this connection between sleeve 14 and member 10 may be such that the parts can be detached without the aid of any tools other than a hammer, sleeve 14 is provided with an arm 21 adapted to be interposed between member 10 and a similar arm 22 formed on member 10.

The two arms are provided with alined openings and threaded in the opening in arm 21 is a stud bolt or pivot pin 23, on which arm 22 from member 10 is journaled, a bronze bushing 24 being provided for wear purposes. To lock arm 22 in pin 23, a locking element, such as wedge 25, is inserted between member 10 and pivot pin 23. Preferably, wedge member 25 is provided with an offset portion 26 pivoted in arm 21 of coupling sleeve 14. With this arrangement, when wedge 25 is forced between pin 23 and member 10, arm 22 will be securely blocked on pivot pin 23. At the same time, the joint between the open end of member 10 and the passage in sleeve 14 will be placed under pressure so as to insure the same being steam tight. It should be added that this joint comprises a gasket 27 held by springs 28 against a spherical surface formed on sleeve 14, a bushing 29 also being interposed between the bearing portions of said member and sleeve. As shown in Figs. 5, 5ª, the wedge member 25 is formed with a multiplicity of openings 30, in which a cotter pin may be inserted to prevent its accidental displacement from between pin 23 and member 10.

With this arrangement sleeve 14 and member 10 are not only securely attached to one another and a steam tight joint effectively maintained between the two, but at the same time, said parts may be quickly disconnected for repair purposes simply by removal of the cotter pin from holes 30 and the removal of wedge member 25 from between pin 23 and member 10. After this, member 10 may be moved axially of pin 23 away from arm 21, so as to give ready access to the joint between the parts. While this is being done, wedge member 25 does not have to be removed entirely, and laid aside, whereby there is a possibility of its being lost, but, on the contrary, it may remain in arm 21.

At its lower end, member 10 is provided with similar connections for attachment to the coupler head, except that the connection between the nipple and the coupling sleeve is such that only a limited turning movement of one part with respect to the other is permitted. In view of this, a detailed description of the connections and securing means is deemed unnecessary, it sufficing that the several parts be identified by the same reference numerals as applied to the connections at the upper end of member 10. For limiting the turning movement of nipple 13 at the lower end of the connecter, said nipple is formed with recesses 32, as shown in Fig. 4, adapted to receive projections or extensions 31 on end of coupling sleeve 14, whereby the nipple and sleeve can move with respect to one another to only a limited extent.

Such an arrangement is preferred because the connection between nipple 13 and coupling sleeve 14, at the upper end of the connecter, allows those parts to swivel throughout a complete circle, this being more than ample to compensate for all curves that a car may be called upon to take in service. It is not, therefore, necessary that the connection between the same parts at the bottom of the connecter be capable of turning throughout a complete circle. On the other hand, a limited turning movement at the lower end of the connecter is necessary to permit the coupler heads to be adjusted when the heads of the two connecters are coupled together and also to permit of the rocking movement of the cars in high and low joints, where one car is twisted, so to speak. If a limited play is not allowed, a torsional twist may be imposed on the parts, so as to rupture the same. Again, by having the nipple 13, which is adapted to connect to the coupler head, limited in its turning movement, the coupler heads when detached from each other are prevented from turning upside down with respect to the sleeves 14. In other words, when two cars are uncoupled, each of them carries a connecter, such as shown, to the lower end of which there is a coupler head, said coupler heads being adapted to be coupled together only when two cars are coupled together. Therefore, when the two cars and their coupler heads are uncoupled, the coupling head of each connecter will be prevented from turning to any great extent, whereby they may readily be alined up with one another if and when they are to be coupled together again.

When the connecters and couplers of two cars are uncoupled, it is important that the lower sleeve and nipple, together with the coupler head carried thereby, be prevented from assuming a dependent position (such as shown in Fig. 3), because, if they should be permitted to extend downwardly from the intermediate member 10, there is great likelihood of their being broken by dragging on the road bed. For the purposes of preventing such accidents, means are provided for holding the lower swivel connection spaced above the road bed and at all times substantially parallel to the surface of the rail. It should also be borne in mind that, when one of two coupled cars carrying these co-operating connecters raises somewhat, the coupler head attached to the forward car will be depressed or lowered, and on the contrary, when the forward car raises, the rear car is lowered, under which circumstances the coupler head of that car will be raised. In view of this, it is essential that the means for supporting the lower swivel connection above the road bed be of a yielding character so as to compensate for these movements of the coupler heads. As a general rule, it might also be stated that the air and signal hose of railway cars cross each other just above the upper surfaces of the steam line connecters, so that the space above the coupled connecters is really needed for the accommodation of these hose. Furthermore, it is desirable that the means for supporting the lower swivel connection above the road bed be so positioned as not to interfere with the air and signal hose so as to prevent their being accidentally uncoupled or wearing said hose and possibly causing serious accidents due to interference with the air brake mechanism of the train.

Having these matters in mind, the means for supporting the lower swivel connection above the road bed in the novel construction shown in the drawings is arranged at the rear of the connecter and yieldingly supports said swivel connection, thereby compensating for the movements of the two cars and, at the same time, leaving the space above the coupler heads unoccupied for the accommodation of the air and signal hose. Preferably, this swivel connection supporting means comprises a tubular member 33 pivotally supported at its upper end in rear of the intermediate member 10 of the connecter. For instance, this tubular member may be pivoted in a socket 34 formed on coupling 14 of the upper swivel connection, said member being retained in the socket by a cotter pin 35 secured in a stud 36 which is formed as a part of the wall of said socket 34 and projects through an aperture in the upper end of the tubular member. The stud 36 simply functions to retain the upper end of the tubular member between the cotter pin 35 and the side wall 37 of the socket, the said tubular member being loosely mounted on the stud 36 and actually bearing on the inner surface of said socket. To facilitate attachment of the end of the tubular member in said socket, said end may be flattened as at 38.

Telescoping within the tubular member 33 is a rod 39 whose lower end may be flattened as at 40, said flattened end portion being secured on a stud 41 by a cotter pin 42, this stud 41 being formed integrally with the side portion 43 of socket 44 carried by the coupling 14 of the swivel connection at the lower end of the connecter.

Within tubular member 33 and interposed between the bottom of the recess in that member and the end of rod 39 is a coil spring 45 that tends to hold the telescoping parts 33, 39 distended, the strength of said spring being such as to normally hold the lower swivel connection of the connecter substantially parallel to the road bed or rail surface. Due to the lateral curvature of intermediate member 10, socket 34 is closed by side wall 37 at one side and socket 44 is closed by the side wall 43 at the opposite side. With this construction, if the vertical movement of one of the two coupled cars is such that the coupler head tends to raise so as to turn the lower swivel connection on its pivotal center, rod 39 will be free to slide away from tubular member 33 to compensate for such movement of the car. On the other hand, if the tendency of the coupler is to be depressed, rod 39 will be forced into the tubular member 33 against coil spring 45. However, when the two cars are disconnected, the coil spring 45 will normally position tubular member 33 and rod 39 with respect to one another in such fashion that the lower swivel connection will always be maintained in proper spaced relation above the road bed and substantially parallel to the surface of the rails.

The telescoped rod and tube and compression spring 45 in said tube provide what may be termed a resilient variable length device arranged to swing in substantial parallelism with the intermediate rigid section 10 of the connecter, being pivotally connected to the upper and lower sections and acting therebetween in a manner to afford a yieldable supporting means as already explained. By arranging said device substantially parallel with the intermediate section and of a length between the centers of its pivotal connections substantially equal to the distance between the centers of the swing joints of the connecter, the said swinging section and resilient variable length device and the lines between said swing joint centers and centers of the pivots of said device form substantially a parallelogram. The result is that as the intermediate section of the connecter swings to and fro relative to the upper and lower sections, and so long as the lower section is held horizontal (it being normally so held by coupling attachment with the connecter of an adjacent car), there is no material change of length of said device and hence no substantial stressing of the spring by the swinging action and hence no resistance to the adjusting motions of the connecter.

It will be understood that when the steam pipes of adjacent cars are connected by two connecters, the one connecter will normally be in about the position shown, and the other connecter will be in a similar but symmetrically arranged position. As the distance between the points of suspension of the two connecters varies due to relative motions between the cars, the intermediate sections of the connecters will swing in opposite directions, raising or lowering the coupled lower sections but keeping them horizontal. The resilient variable length device is so located as not to interfere with the adjusting action of the connecter within the limits of the swinging movements which the intermediate section would have under ordinary operative conditions.

It will be understood that the invention is not limited to the particular embodiment shown and described, and that while the described structure is primarily intended for use as a train pipe connecter it may be used for other analogous purposes, and therefore I desire to protect the same for such purposes for which it may be adapted.

What I claim is:

1. In a swing jointed metal train pipe connecter, an intermediate member, connections swiveled to one end of said member for attachment to the end valve of a railway car train pipe, connections swiveled to the other end of said member for attachment to a coupling head, and means carried by the first mentioned swivel connections and connected to the second swivel connection constantly urging the free end of the latter upwardly, there being no part of said means in front of the connecter.

2. In a swing jointed metal train pipe connecter, an intermediate member, connections swiveled to one end of said member for attachment to the end valve of a railway car train pipe, connections swiveled to the other end of said member for attachment to a coupling head, and means carried by the first mentioned swivel connections and attached to the second swivel connection urging the free end of the latter upwardly at all times, said supporting means being behind the intermediate member.

3. In a swing jointed metal train pipe connecter, an intermediate member, connections swiveled to one end of said member for attachment to the end valve of a railway car train pipe, connections swiveled to the other end of said member for attachment to a coupling head, sockets carried by each of said swivel connections, and a collapsible and extensible rod pivotally retained in said sockets and adapted to constantly urge the free end of the second mentioned swivel connection upwardly.

4. In a swing jointed metal train pipe connecter, an intermediate member, connections swiveled to one end of said member for attachment to the end valve of a railway car train pipe, connections swiveled to the other end of said member for attachment to a coupling head, a projection on the second swivel connection movable vertically upward upon movement of said swivel connection toward the surface of the ground, and means interposed between said projection and the first mentioned swivel connection for yieldingly resisting such upward movement of said projection.

5. In a swing jointed metal train pipe connecter, an intermediate member adapted to be suspended from a railway car, connections swiveled at the upper end of said member for attachment to the end valve of said car, connections swiveled to the lower end of said member for attachment to a coupling head, projections carried by each of said swivel connections, the projection on the lower connection being movable upwardly upon movement of said swivel connection toward the ground surface, and means interposed between said two projections for yieldingly resisting upward movement of the projection on the lower swivel connection.

6. In a swing jointed metal train pipe connecter, an intermediate member adapted to be suspended from a railway car, swivel connections at the upper end of said member for attachment to the end valve of the train pipe of said car, connections swiveled to the lower end of said member for attachment to a coupling head, sockets carried by each of said swivel connections, a tubular member pivotally retained in one of said sockets, a rod pivotally retained in the other of said sockets, and telescoping within said tubular member, and a spring carried in said tubular member for yieldingly holding said telescoping members distended.

7. In a swing jointed metal train pipe connecter, an intermediate member, connections swiveled to one end of said member for attachment to the end valve of a railway car train pipe, connections swiveled to the other end of said member for attachment to a coupling head, and a suspension member pivotally supported in rear of said intermediate member and attached to the last mentioned swivel connections for supporting the latter in a position above the track surface when the connecter is uncoupled, there being no part of said suspension member in front of the connecter.

8. A train pipe connecter comprising an articulated conduit structure including an intermediate member and adjacent members having swing-joint connections with opposite ends of said intermediate member, and having means arranged behind said intermediate member and connected to and acting between said adjacent members for yieldingly holding up the lower free end of the structure.

9. A train pipe connecter comprising an articulated conduit structure including an intermediate member and adjacent members having swing-joint connections with said intermediate member, and having means arranged behind said intermediate member for yieldingly supporting the lower part of the structure, said means comprising a telescoped rod and tube and a compression spring in said tube, the tube and rod being pivotally connected respectively to the said adjacent members.

10. A train pipe connecter comprising an articulated conduit structure including an intermediate member and adjacent members having swing joint connections with said intermediate member, and having means arranged behind said intermediate member for yieldingly supporting the lower part of the structure, said means comprising a telescoped rod and tube and a compression spring in said tube, the tube and rod being pivotally connected respectively to the said adjacent members.

11. A device of the class described comprising an articulated conduit structure having means carried thereby for yieldingly urging a portion thereof to a desired position relative to another portion, said means comprising a telescoped rod and tube and a compression spring in said tube, the rod and tube being pivotally connected with elements of the structure, and the arrangement being such that the spring exerts a push action between said elements.

12. A train pipe connecter comprising a flexible metallic conduit structure adapted to be suspended from a railway car train pipe and to have its lower end supported in a forwardly extending position by coupling attachment to the connecter of an adjacent car and having a suspensory means carried by the structure and arranged to swing with a swinging portion thereof and disposed clear of the front of the connecter and operative for yieldingly upholding the lower end of the connecter in a non-dependent position when it is unsupported by such coupling attachment, said structure comprising an intermediate swinging section having elbow extremities and adjacent sections having elbow extremities swivel jointed to the elbow extremities of said intermediate section, and said suspensory means comprising a resilient variable length device pivotally connected to said adjacent sections.

13. A train pipe connecter comprising a flexible metallic conduit structure adapted to be suspended from a railway car train pipe and to have its lower end supported in a forwardly extending position by coupling attachment with the connecter of an adjacent car and having a resilient variable length device arranged behind and substantially parallel with and swingable with an intermediate portion of the structure and connected with and exerting a push action between elements of the structure so as yieldingly to sustain the lower portion in a non-dependent position when it is unsupported by such coupling attachment, the said elements with which said resilient variable length device is connected having swing joint connections with the opposite ends of the intermediate swinging portion of the structure with which said device is associated.

14. A train pipe connecter comprising a flexible metallic conduit structure adapted to be suspended from a railway car train pipe and to have its lower end supported in a forwardly extending position by coupling attachment with the connecter of an adjacent car, said structure including an intermediate section swingingly connected to the upper and lower sections of said structure, and means operative to uphold the lower section in a non-dependent position when it is unsupported by such coupling attachment, said means comprising a resilient variable length device pivotally connected with said upper and lower sections and arranged to be stressed by movement of the lower section toward a dependent position, the said device being disposed rearwardly of and substantially parallel with said intermediate section and of substantially the same length between the centers of its pivotal connections as the distance between the centers of the swing joints connecting the intermediate section to the upper and lower sections, whereby said device will swing in substantial parallelism with the intermediate section without resisting the normal swinging action of the structure when said lower section is supported in its forwardly extending position by such coupling attachment.

15. A train pipe connecter comprising swingingly connected upper, intermediate and lower sections and having a resilient variable length device connecting said upper and lower sections and operative to yieldingly uphold the lower section in a non-dependent position when it is unsupported by coupling attachment with another connecter, the said device being arranged behind said intermediate section and including a compression spring adapted to be stressed by movement of the lower section toward a dependent position, and said device being substantially parallel with said intermediate section and of substantially the same length between its connections as the length of the intermediate section between the centers of its swing joints, whereby said device will swing in substantial parallelism with said intermediate section without resisting the normal swinging action of the structure when in connection with another connecter.

16. A train pipe connecter comprising swingingly connected upper, intermediate and lower sections, the upper and lower sections having rearwardly extending arms, and a resilient variable length device pivotally connected with said arms and including a compression spring whereby said device is operative to yieldingly uphold the lower section in a non-dependent position when it is unsupported by coupling attachment with another connecter, said intermediate section and said resilient variable length device and the lines connecting the pivot centers of the latter with the centers of the swing joints of said intermediate section being arranged substantially according to a parallelogram.

17. A train pipe connecter comprising a flexible conduit structure adapted to be suspended from a railway car train pipe and to have its lower end supported in a forwardly extending position by coupling attachment to the connecter of an adjacent car, and having means comprising a resilient variable length device so connected with non-adjacent sections of the structure as to be stressed by movement of its lower end thereof toward a dependent position, whereby yieldingly to uphold the lower end in non-dependent position when the two connecters are uncoupled, said device being swingable with and arranged longitudinally of an intermediate part of the structure and wholly clear of the space between the two connecters.

18. A flexible metallic hose adapted for suspension from a connection with one end thereof, the same embodying an intermediate swingable member and having a resilient variable length device arranged behind and substantially parallel with said swingable member and pivotally connected with and exerting a push action between the members to which the intermediate member is connected and operative to uphold the lower member in a non-dependent position, the length of said device between its pivotal connections being substantially the same as the distance between the centers of the swing joints of said intermediate member.

19. A flexible metallic hose comprising a plurality of articulated members including an intermediate swingable member, certain of said members other than the intermediate member having projections on the same side of the structure, and a compression spring arranged longitudinally of and swingable with said intermediate member and exerting a push action between said projections, whereby the lower end of the hose when suspended is urged toward a non-dependent position.

20. A flexible metallic hose having an intermediate member swingable in relation to the members connected thereto and having a connecting means between said last mentioned members including a compression spring exerting a push action between said last mentioned members.

21. A flexible metallic hose having an intermediate member swingable in relation to the members connected thereto and having a connecting means between said last mentioned members comprising a telescoped rod and tube and a compression spring in the tube yieldingly distending the said connecting means.

22. A flexible metallic hose having an intermediate member swingable in relation to the members connected thereto and having a telescoped rod and tube pivotally connected to the last mentioned members and a compression spring in said tube urging one of said last mentioned members toward a desired position relative to the intermediate swinging member.

23. A flexible connection including a joint member, a second joint member, and a connection member between the joint members including means at the ends of the said connection member rotatably associated with the joint members, the said means being arranged to provide parallel axes of rotation, together with a resilient supporting means secured to and reacting between the joint members.

LEONIDAS D. WOODRUFF.